United States Patent [19]
Kühl

[11] Patent Number: 5,552,839
[45] Date of Patent: Sep. 3, 1996

[54] PROJECTION SYSTEM FOR ENTERTAINMENT AND GAME APPARATUS

[75] Inventor: Thomas Kühl, Daxweiler, Germany

[73] Assignee: NSM Aktiengesellschaft, Bingen, Germany

[21] Appl. No.: 522,931

[22] Filed: Sep. 1, 1995

Related U.S. Application Data

[63] Continuation of Ser. No. 137,796, Oct. 19, 1993, abandoned.

[30] Foreign Application Priority Data

Oct. 26, 1992 [DE] Germany ............ 42 36 091.9

[51] Int. Cl.⁶ ..................................... H04N 5/74
[52] U.S. Cl. .................. 348/744; 348/747; 348/761; 348/766
[58] Field of Search .................... 348/36, 761, 766, 348/96, 747, 744, 507, 578; 353/69, 70; 434/314, 180, 350, 324, 307 R, 308; 359/443, 668; 395/125; H04N 7/00, 9/31, 9/45, 9/455, 5/74, 5/253, 3/223, 3/227, 9/74

[56] References Cited

U.S. PATENT DOCUMENTS

| | | | |
|---|---|---|---|
| 1,876,269 | 9/1932 | Yagle | 359/443 |
| 4,305,131 | 12/1981 | Best | 348/96 |
| 4,656,506 | 4/1987 | Ritchey | 348/39 |
| 4,695,903 | 9/1987 | Serap et al. | 434/308 |
| 5,130,794 | 7/1992 | Ritchey | 348/39 |
| 5,317,348 | 5/1994 | Knize | 348/750 |
| 5,329,310 | 7/1994 | Liljegren et al. | 348/121 |

*Primary Examiner*—Safet Metjahic
*Assistant Examiner*—Nina M. West
*Attorney, Agent, or Firm*—Spencer & Frank

[57] ABSTRACT

The present invention relates to a video system for entertainment and game apparatus. The video system includes a data carrier on which the game is stored. Video informations (pictures) stored on the data carrier are displayed on a display unit. By a lens and projection system the picture is imaged on a curved projection screen that at least partially surrounds the player. Preferably, the video informations are stored on the data carrier in pre-equalized form so that the image projected on the projection screen is essentially free of distortion.

10 Claims, 1 Drawing Sheet

PROJECTION SYSTEM FOR ENTERTAINMENT AND GAME APPARATUS

This application is a continuation, of application Ser. No. 08/137,796, filed Oct. 19, 1993 now abandoned.

CROSS REFERENCE TO RELATED APPLICATION

This application claims the priority of Application Ser. No. P 42 36 091.9, filed Oct. 26th, 1992, in the Federal Republic of Germany, the subject matter of which is incorporated herein by reference.

BACKGROUND OF THE INVENTION

The present invention relates to a projection video system for entertainment and game apparatus.

All entertainment and game apparatus are equipped with display units which are designed to be as attractive as possible. The more pleasing the optical and acoustic display of the game, the more people use and accept such a device. This is the case particularly for video apparatus.

In order to optically improve the presentation of the game, various concepts have been developed. For example, a video system has been proposed in which a three-dimensional impression is created in that two further monitors are placed next to the sides of the main monitor.

A system has also been developed that is called "virtual reality"; its display is to be perceived as three-dimensional. To realize this effect, the player, however, must wear a helmet. This adversely influences acceptance because the wearing of a helmet is usually considered to be unpleasant.

In 1992, the firm SEGA introduced an apparatus equipped with a viewing screen that displays a conventional two-dimensional image. This image is reproduced on a curved mirror in order to furnish a three-dimensional display for the viewer. However, great distortions appear on the sides, that is, on the outer regions of the mirror, thus considerably impairing the quality of the reproduction.

So-called head-up displays have been developed by the firm ASK A.S., N-1601 Fredrikstad, Norway, particularly for windshields of motor vehicles. These displays throw operating parameters such as speed, rpm, etc., onto the windshield holographically. In this way, the driver of the vehicle will not need to refocus his eyes from far to near in order to read the display. At the same time he is to be enabled to observe the displays simultaneously with the traffic.

To broaden the display possibilities of personal computers, LCD display projection systems have been developed in which the display on the screen is enlarged. For this purpose, a projection plate is connected with the personal computer and is arranged on an overhead projector. By means of the overhead projector, the display is enlarged and directed onto a projection screen. In this way, any desired number of spectators are able to follow the computer display on-line. This LCD projection system can be employed with the use of standard VGA cards and conventional software.

To improve the optical and acoustical display of personal computer output signals, so-called multimedia units have been disclosed by ATI Technologies Inc., Ontario, Canada; they include on a single card, a plurality of graphic and sound options, including units for a mouse, a joystick and a MIDI [musical instrument digital interface]. A plurality of drivers and compatible terminals are provided on this card.

SUMMARY OF THE INVENTION

It is an object of the present invention to provide a video system which permits the most natural possible three-dimensional appearance of the display.

This is accomplished according to the invention in a video system comprising:

a data carrier (10) on which the game is stored;

a display unit (12) on which the video informations (pictures) stored on the data carrier (10) are displayed;

a lens and projection system (16, 18); and a curved projection screen (20) which at least partially surrounds the player (36) and on which the picture is displayed by way of the lens system (18). Advantageous modifications of the video system according to the invention are defined in the dependent claims.

A video system according to the invention for entertainment and game apparatus thus includes a data carrier on which the game is stored. Video informations (pictures) that are stored on the data carrier are displayed on a display unit. Also provided is a lens and projection system by means of which the image is reproduced on a curved projection screen that at least partially surrounds the player.

The video system according to the invention operates as follows: the game is electronically stored on the data carrier. The stored game data are transmitted to the display unit which converts the game informations into video informations and displays them as a picture. The display unit advantageously includes an LCD matrix as it is increasingly employed for video slide projections.

The display unit reproduces the picture by way of a lens and projection system on a curved projection screen. For this purpose, the optical system includes a dispersing lens. Preferably, the projection screen is configured as a generated sphere segment, hemisphere or sphere surface, thus producing a particularly good three-dimensional impression. The player is here at least partially surrounded by the projection screen so that his impression of actively participating in the game, also from a space related aspect, is augmented. Preferably the surface area of the projection screen here approximately corresponds to the natural field of view of the human eye.

An advantageous configuration of the projection screen exists if the latter is made of linen or another textile material.

To produce a realistic impression, the projected image must be as realistic as possible. For this purpose, an advantageous embodiment of the video system according to the invention is distinguished in that the video information is stored on the data carrier in a pre-equalized form in such a way that the image projected onto the projection screen is essentially free of distortion. The stored data have thus been processed in such a way that the subsequent distortion during projection has been considered in advance by returning the three-dimensionally generated image to a surface generated image. Due to the distortion, the human eye would be unable to identify the two-dimensional image of the display unit as the desired picture.

In an advantageous embodiment, the projection screen is made of a semi-transparent material. Similarly to the head-up displays this results in the actual focal points lying behind the projection screen. A depth of focus of about 15 m is used. This may make it necessary to provide a light source that generates coherent light, for example laser light.

Particularly for the reason that the game happenings are displayed substantially in the same way as the player experiences them in reality, the video system according to the invention gives the display a three-dimensional effect that is very true to nature. Approximately the natural horizon of the eye is used, with a depth of field resulting that essentially corresponds to the customary depth of field. In this way, game scenes are experienced very close to reality and almost in a participatory manner.

To increase the natural impression of the display, the audio presentation may also be made closer to reality. Preferably an acoustic system equipped with ambiophonic means is employed in which an audio signal source can advantageously be added to the video projection in such a way that the player receives video and audio information simultaneously. In addition, the audio signal source advisably includes units that are distributed in space. These then send out audio signals from various locations which arrive at the player's ear with delays caused thereby, as this is also the case in reality. In addition, the audio signal source may, however, also put out delayed audio signals in such a way that, with respect to time as well, the player perceives the audio information essentially as true to nature with respect to the video information.

BRIEF DESCRIPTION OF THE DRAWING

One embodiment of the invention will now be described schematically with reference to the sole drawing FIG. 1, which depicts the configuration of a video system for entertainment and game apparatus.

DETAILED DESCRIPTION OF THE PREFERRED EMBODIMENT

Figure 1:
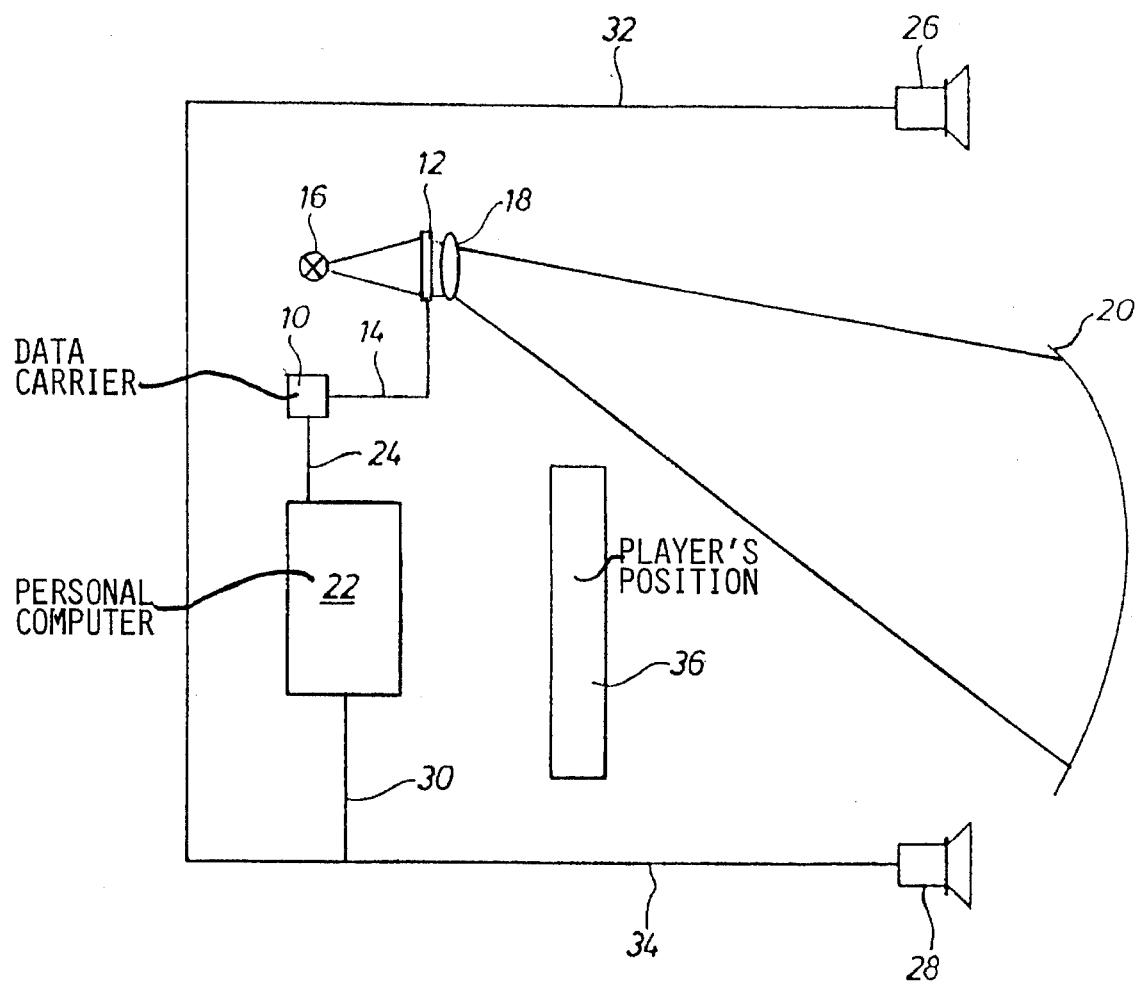

A data carrier 10 includes stored game informations. A display unit 12 is connected with data carrier 10 by way of a line 14. A lens and projection system 16, 18 is shown only schematically and serves to project the images of display unit 12 on a curved projection screen 20. In the illustrated embodiment, projection screen 20 is made of a linen material.

The game is stored in a pre-equalized manner on data carrier 10 for later projection, that is, the video data given to display unit 12 produce a display thereon that cannot be perceived as true to nature because the distortions connected with its projection on projection screen 20 have been considered.

In the illustrated embodiment, data carrier 10 is connected with a personal computer 22 by way of a line 24. By means of the personal computer, the respectively desired game can be selected. Moreover, the parameters can be set and the game happenings can be influenced.

To increase the reality perception of the game, display unit 12 is coupled by way of personal computer 22 with an audio signal source. The audio signal source includes two loudspeakers 26 and 28 which are connected by way of lines 30, 32 and 34 with the personal computer and the audio signal source, respectively. The loudspeakers are distributed in space, that is, positioned so that, in addition to the optical three-dimensional impression, an acoustical stereophonic impression of the game results for the player.

In FIG. 1, the player's position is shown purely schematically by the reference numeral 36. The player is thus at least partially surrounded by projection screen 20, thus augmenting the three-dimensional impression. Loudspeakers 26 and 28 are distributed in space. Of course more than two loudspeakers may be provided in which case it should be considered that the sphere of the audio and video display (20, 26, 28) extends around the player in a vertical as well as a horizontal orientation.

The above description of the invention is merely schematic and intended for explanation purposes. However, further embodiments are possible within the protective scope of the claims.

It will be understood that the above description of the present invention is susceptible to various modifications, changes and adaptations, and the same are intended to be comprehended within the meaning and range of equivalents of the appended claims.

What is claimed is:

1. A video system for entertainment and game apparatus, comprising:

a curved screen which at least partially surrounds a user;

a data carrier on which video information relating to images of a game is stored in a pre-equalized manner to compensate for distortions connected with a later projection of the images onto the curved screen;

a liquid crystal display matrix coupled to the data carrier for displaying images of the game based on the pre-equalized information such that the images of the game displayed on the liquid crystal display are two-dimensional images containing distortions;

a lens and projection system for projecting the image displayed on the liquid crystal display matrix onto the curved screen to produce a three-dimensional image free of distortion.

2. A video system as defined in claim 1, wherein the projection screen is made of a textile material.

3. A video system as defined in claim 1, wherein the projection screen is configured as a generated sphere segment, hemisphere or sphere surface.

4. A video system as defined in claim 1, wherein a surface area of the projection screen corresponds approximately to a natural field of view of the user.

5. A video system as defined in claim 1, wherein the projection screen is made of linen.

6. A video system as defined in claim 1, wherein the projection screen is made of a semi-transparent material.

7. A video system as defined in claim 1, wherein a light source of the projection system generates coherent light.

8. A video system as defined in claim 1, wherein an audio signal source can be connected with the lens and projection system in such a manner that the user simultaneously receives video and audio informations.

9. A video system as defined in claim 8, wherein the audio source includes units that are positioned for providing an acoustical stereophonic impression to the user.

10. A video system as defined in claim 8, wherein the audio signal source emits delayed audio signals in such a manner that the user perceives the audio information essentially true to nature with respect to the video information.

* * * * *